United States Patent

Hohner et al.

[11] Patent Number: 5,801,534
[45] Date of Patent: Sep. 1, 1998

[54] CIRCUIT FOR ION CURRENT MEASUREMENT IN COMBUSTION SPACE OF AN INTERNAL COMBUSTION ENGINE

[75] Inventors: Peter Hohner, Echterdingen; Jens Schirmer, Heilbronn, both of Germany

[73] Assignee: Temic Telefunken microelectronic GmbH, Heilbronn, Germany

[21] Appl. No.: 675,641

[22] Filed: Jul. 3, 1996

[30] Foreign Application Priority Data

Jul. 5, 1995 [DE] Germany ............ 195 24 539.3

[51] Int. Cl.$^6$ ............ F02P 17/00; F02P 3/04
[52] U.S. Cl. ............ 324/399; 324/378; 123/644; 73/116
[58] Field of Search ............ 324/378, 388, 324/391, 393, 399; 73/116, 117.2, 117.3, 35.01, 35.08; 123/650, 655, 656, 644, 630

[56] References Cited

U.S. PATENT DOCUMENTS

| | | | |
|---|---|---|---|
| 3,650,149 | 3/1972 | Howes | 73/116 |
| 3,838,328 | 9/1974 | Lundy | 123/598 |
| 4,922,883 | 5/1990 | Iwasaki | 123/656 X |
| 5,424,647 | 6/1995 | Ohsawa et al. | 324/399 X |
| 5,548,220 | 8/1996 | Kawamoto et al. | 324/399 |
| 5,602,332 | 2/1997 | Pyko | 73/117.3 |

FOREIGN PATENT DOCUMENTS

| | | |
|---|---|---|
| 3006665 | 9/1981 | Germany . |
| 3327766 | 2/1985 | Germany . |
| 3342723 | 6/1985 | Germany . |
| 3928726 | 3/1991 | Germany . |

*Primary Examiner*—Vinh P. Nguyen
*Assistant Examiner*—Diep Do
*Attorney, Agent, or Firm*—Spencer & Frank

[57] ABSTRACT

An alternating current ignition system which can be used in one of two ways for ion current measurement. On the one hand, an oscillating circuit at the primary end of the ignition coil can be driven such that, after ignition has taken place, an alternating current signal is generated at the primary end; the amplitude of the alternating current signal must be sufficiently low so as not to cause any sparks at the secondary end, but lead to an alternating voltage signal which is modulated in relation to the ionisation degree of the ignition spark gap and thus represents an ion current measurement signal. On the other hand, however, if an auto transformer is used as an ignition coil, the intermediate circuit voltage applying at the primary end will be modulated in the medium-high voltage range of, e.g, 180 V in relation to the degree of ionisation, so that this supply voltage is used as a measurement signal.

8 Claims, 3 Drawing Sheets

CIRCUIT FOR ION CURRENT MEASUREMENT IN COMBUSTION SPACE OF AN INTERNAL COMBUSTION ENGINE

BACKGROUND OF THE INVENTION

The invention concerns a circuit layout to provide for ion current measurement within the combustion space of an internal combustion engine, comprising a) an ignition coil complete with primary and secondary circuits, b) a spark plug, located within the secondary circuit, which also serves as an ion current probe, c) where, following ignition in the combustion space, a voltage signal will be generated within the secondary circuit, whose amplitude value is lower than the ignition voltage required for ignition and which effects a modulated voltage signal, as an ion current measurement signal, within the secondary circuit in relation to the ionisation degree of the ignition spark gap.

Such a circuit layout is known from DE 33 27 766 A1 which is used to detect knocking in an internal combustion engine and where in the combustion space of each cylinder a spark plug is located that is also used as an ion current probe. To obtain a measurement signal for the ion current, an alternating voltage will be generated at the primary end of the ignition coil; this alternating voltage will produce an ion current measurement signal at the secondary end, with the ion current variations modulating onto the measurement signal. This amplitude-modulated alternating voltage signal at the secondary end will be decoupled at the secondary end and processed by an evaluation circuit.

This known circuit layout comprises a transistor ignition where a high frequency generator serves to produce the alternating voltage signal at the primary end; the impulse-shaped output signals of the high frequency generator are fed into the control electrode of the ignition transistor.

The disadvantage of this known circuit is that a high frequency oscillator is necessary; this increases the requirements for an ignition output stage and thus causes additional costs.

SUMMARY OF THE INVENTION

The object of the invention is to provide a circuit layout which, in comparison to the known circuit layout for ion current measurement, features a simpler setup.

According to the invention there is an ignition output stage which operates according to the principle of alternating current ignition; this ignition output stage is known from DE 39 28 726 A1 and is simultaneously used to generate, at the primary end, the alternating current signal utilized for ion current measurement. Here, the only requirement is that the switch controlling the oscillating circuit located within the primary circuit of the ignition coil, and which switch is a transistor, will be controlled such by a control circuit such that oscillations arise within this oscillating circuit which oscillations do not suffice at the secondary end for starting an ignition process. Such an alternating voltage signal will be generated at the primary end after an ignition has taken place.

When using an ignition coil set up as an isolating transformer, i.e. which features a primary as well as a separate secondary winding, the measurement signal is coupled in by means of a test arrangement located within the secondary circuit of the ignition coil.

An advantageous further development is also to be found in the use of an auto transformer as an ignition coil. In this case, the ion current measurement signal will be tapped by means of a test arrangement connected to the primary end of the auto transformer, as there is no high voltage applied at that end. With this embodiment of the invention, secondary end components will not be required.

In order to be able to evaluate the measurement signal reliably, the frequency of the coupled-in alternating voltage signal should be selected such that this signal frequency is located as far away as possible from the frequency of the ion current variations; this facilitates blanking of the ion current signal.

For a high frequency ion current signal, the selected frequency of the alternating voltage signal at the primary end should be extremely low so that the ion current signal modulates the first half wave; this then represents a quasi-stationary direct voltage within an appropriate measurement interval. For a low frequency ion current signal, however, a high frequency would need to be selected for the alternating voltage signal.

A further solution is provided wherein, for an alternating current ignition, an auto transformer is used as an ignition coil. At its primary end, this auto transformer is supplied with an intermediate circuit voltage in the medium high voltage range following the spark firing phase, this intermediate circuit voltage is used as a measuring voltage as this direct voltage is modulated in relation to the useful signal.

BRIEF DESCRIPTION OF THE DRAWINGS

Using embodiment examples with references to the figures, the invention is to be described and explained below. The figures are as follows.

DESCRIPTION OF THE PREFERRED EMBODIMENTS

Figures 1, 1A:
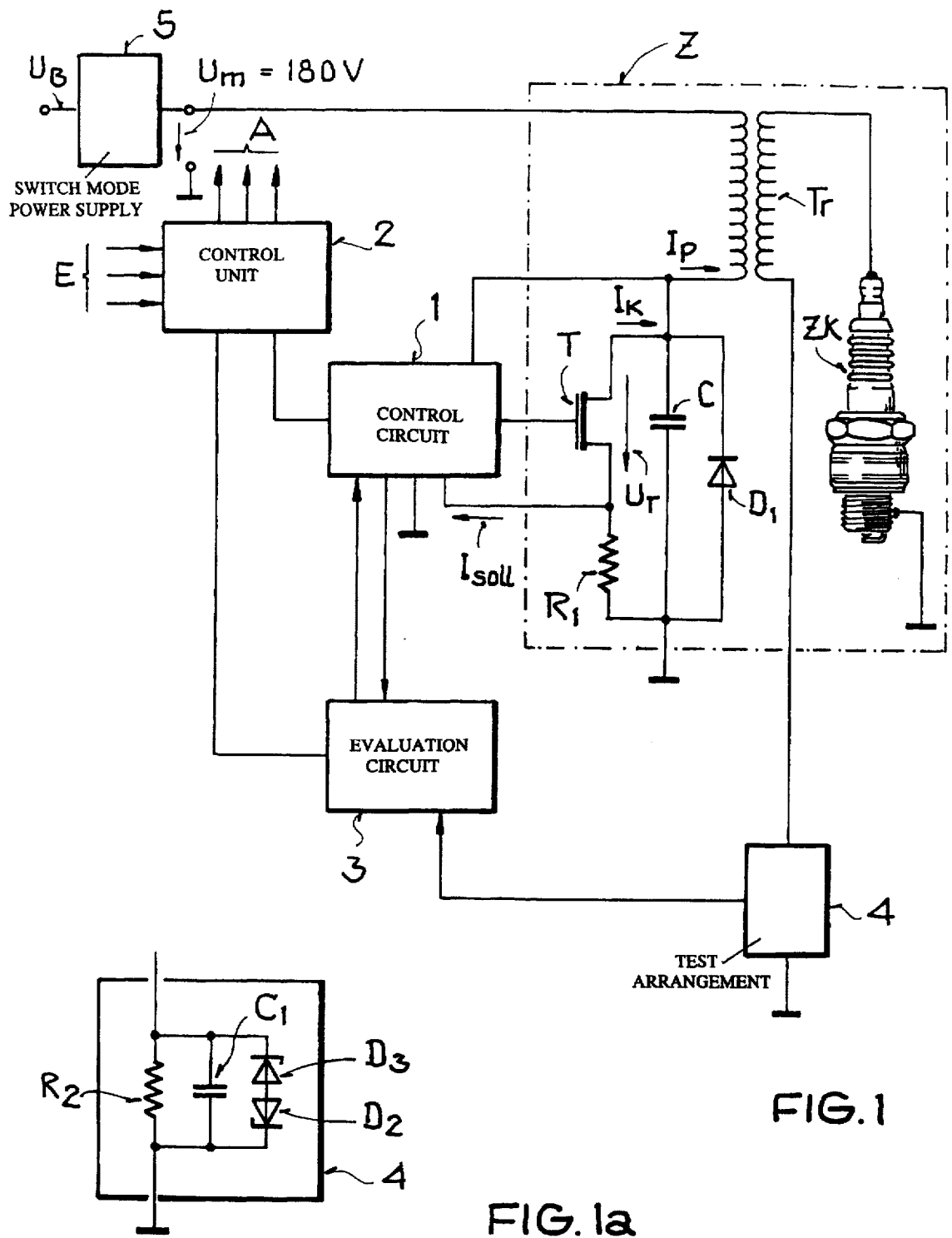
FIG. 1 is a block diagram showing a circuit layout for ion current measurement according to the invention.
FIG. 1a is a circuit diagram showing an embodiment example of a test arrangement 4 shown in FIG. 1.
Figure 4:
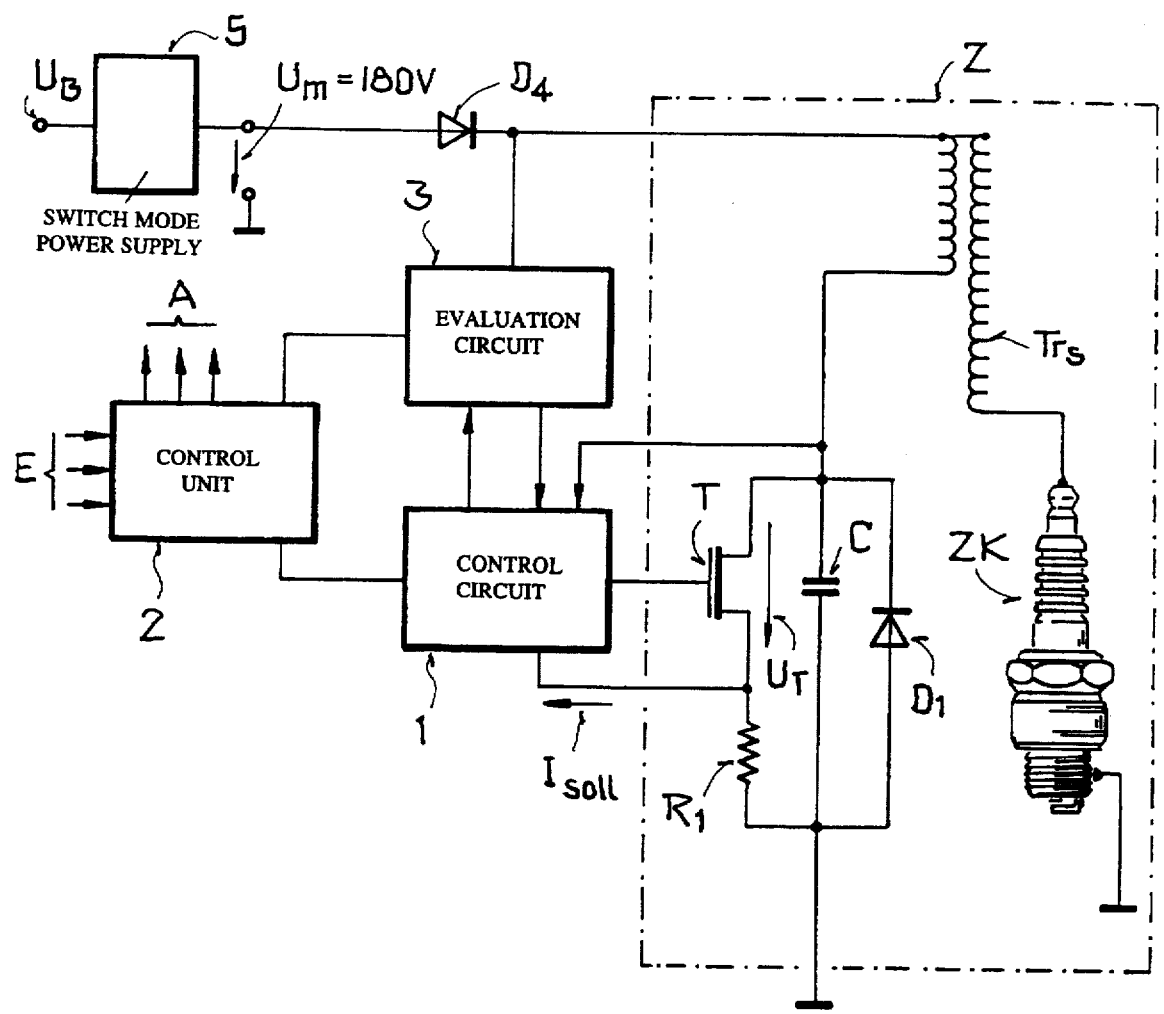
FIG. 4 is a block diagram showing a circuit layout according to the invention using an auto transformer as an ignition coil.

For the sake of simplicity, although the alternating current ignition systems shown in FIGS. 1 and 4 are suitable for multi-cylinder internal combustion engines, only one ignition output stage Z is drawn, respectively, with one spark plug Zk.

The ignition output stage Z according to FIG. 1 comprises an ignition coil $T_r$ featuring both a primary and a secondary winding, with the above-mentioned spark plug Zk being connected to the secondary winding. One terminal of the primary winding is connected to an intermediate circuit voltage $U_m$, and the other terminal is connected to a capacitor C for forming an oscillating circuit. An energy recovery diode $D_1$, as well as a series connection consisting of a transistor T and a current shunt $R_1$, are connected in parallel to this capacitor C. The transistor T receives control signals from a control circuit 1 which is also connected to the current shunt $R_1$ in order to enable detection of the actual value of the current flow across this transistor T.

A control unit 2 takes over an engine management function and is connected with the control circuit 1 in order to provide for a correct ignition distribution via this connection. To this end, this control unit 2 will be supplied by means of an input E with engine parameters such as load, speed, and temperature. Appropriate actuators are controlled via outputs A.

The ignition output stage Z operates in current-controlled flyback and forward converter modes. For the duration of the switch-on process of transistor T, there will be a collector current flow $I_k$ corresponding to the primary coil current $I_p$. This collector current $I_k$ is limited by the control circuit 1 to a preset value $I_{soll}$. In order to achieve short charging times, the primary coil of ignition coil Tr will be supplied with an intermediate circuit voltage $U_m$=180 V generated by a switched mode power supply 5. The switched mode power supply 5 itself is fed by the on-board voltage $U_B$. If collector current $I_k$ has reached the value preset by $I_{soll}$, transistor T will be switched off. The energy contained in the memory (primary) coil will excite the output circuit (secondary inductivity, spark plug capacity) to start oscillating. One part of this energy will transfer into capacitor C, and the other into spark plug capacity. The voltage on capacitor C and the ignition voltage on spark plug Zk will increase sinusoidally until there is no longer any energy in the memory coil, i.e. the primary coil. Now, the capacitively stored energy will be fed again into primary coil inductivity until the voltage at capacitor C reaches zero value. At this point in time, and at the secondary end, the secondary coil will output its existing energy into spark plug capacity. At the primary end, this is not possible in the same way for capacitor C as the voltage at the collector of transistor T cannot become negative due to the energy recovery diode D1 having become conductive. The energy existing in primary inductivity will therefore be returned via this diode D1 into the onboard power supply. At the secondary end, oscillation will continue due to the primary and secondary inductivities being coupled with only 50% of their values. During this time period transistor T will be switched back on as now the same voltage ratios will be present as before the first switch-on of the transistor. The current control will ensure that the primary coil is always supplied with the same level of energy. The share of energy supplied which is not needed inside the spark channel will be returned completely into the onboard power supply system. In the event of a sparkover occurring, the coupling of approximately 50% will prevent a total damping of the primary oscillating circuit by means of the strongly dampened secondary oscillating circuit.

Figure 2:
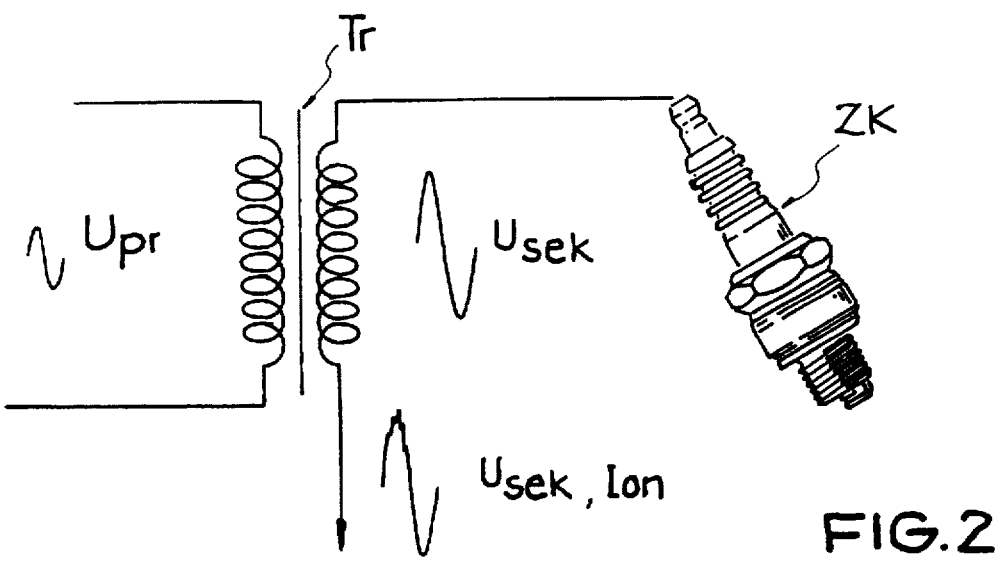
FIG. 2 is a schematic diagram of an ignition coil complete with the alternating voltage signals necessary for generating an ion current measurement signal.

Between two ignition cycles transistor T can now be driven such by control circuit 1 such that following a freely selectable spark firing period at spark plug Zk in the primary circuit, an alternating voltage signal $U_{pr}$ is generated in the form of oscillating circuit oscillations whose amplitude is sufficiently low so as not to cause any igniting sparks at the secondary end. The amplitude of the secondary voltage $U_{sek}$ should then have a medium-high voltage level, e.g. <1 kv (see FIG. 2). This alternating voltage signal $U_{sek}$ causes a current flow across the ionised igniting spark gap. Here, ion current variations will effect an amplitude modulation of the alternating voltage signal $U_{sek}$ which is designated as $U_{sek, Ion}$ in FIG. 2.

Figure 3A:
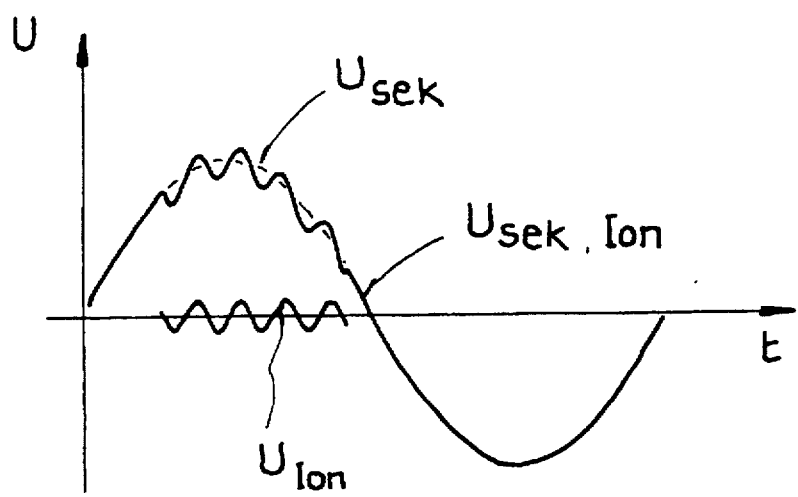
FIGS. 3a and 3b are time-voltage diagrams for explaining how an ion current measurement signal is generated.
Figure 3B:
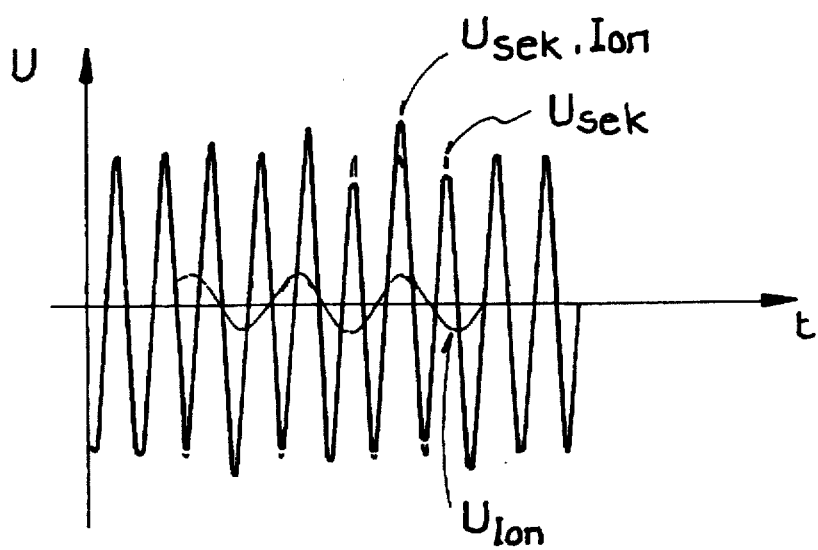

These voltage quantities $U_{sek}$, $U_{sek, Ion}$, and the ion current measurement signal $U_{Ion}$ proper, are shown by way of illustration in the time-voltage diagrams according to FIGS. 3a and 3b, where, for the sake of simplicity, $U_{Ion}$ has been drawn sinusoidally.

The frequency $f_{U_{pr}}$ of the alternating voltage signal $U_{pr}$ generated at the primary end should be located as far away as possible from the frequency $f_{U_{Ion}}$ of ion current signal $U_{Ion}$ as this will facilitate the decoupling of the measurement signal. Thus, a high frequency ion current signal $U_{Ion}$ requires a low frequency $f_{U_{pr}}$ of the alternating voltage signal $U_{pr}$, so that this ion current signal $U_{Ion}$ modulates the first half wave of alternating voltage signal $U_{sek}$; this will cause a quasi-stationay direct voltage to occur within the relevant measurement interval, as shown in FIG. 3a. FIG. 3b shows the reverse case where for low frequencies of the ion current signal $U_{Ion}$ the frequency of the alternating voltage signal $U_{pr}$ is very much higher; in consequence, this facilitates decoupling of the ion current signal $U_{Ion}$ across a low pass filter. The respective decoupled ion current signal $U_{Ion}$ is also shown in FIGS. 3a and 3b.

The modulated alternating voltage signal $U_{sek, Ion}$ will be tapped by means of a test arrangement 4 at the low current end of the secondary winding on ignition coil Tr. Decoupling can be effected by means of a high impedance resistor, a coupling coil, a capacitor, a semiconductor component, or a combination of these elements, as is illustrated by way of example in FIG. 1a using a resistor $R_2$, a capacitor $C_1$, and two Z diodes $D_2$ and $D_3$ connected in series.

The alternating current ignition according to FIG. 4 differs from that shown in FIG. 1 only in that an auto transformer $Tr_s$ is used as an ignition coil. Using this circuit according to FIG. 2, a measurement signal for ion current measurement can be generated in two ways.

At first, as for the circuit according to FIG. 1, and following the spark firing phase, transistor T will be driven such that an alternating current signal arises at the primary end, which induces an alternating current signal at the secondary end that will not cause an ignition but be modulated in relation to the degree of ionisation. This modulated alternating current signal represents the measurement signal, i.e, the ion current signal proper and will be tapped at the primary end between a protective diode D4, connected with the switched mode power supply 5, and the primary end of ignition coil $Tr_s$. It will then be fed into tie evaluation circuit 3.

The other possibility for generating an ion current signal involves using the intermediate circuit voltage $U_m$ provided by the switched mode power supply 5 as a measurement direct voltage. As the ignition col $Tr_s$ is connected at its primary end via protective diode D4 to switched mode power supply 5, this intermediate circuit voltage $U_m$, e.g., at a level of 180 V, is constantly applied to spark plug Zk. In consequence, this direct voltage $U_m$ can be used as a measurement signal for ion current measurement as, following the spark firing phase at spark plug Zk, this direct voltage $U_m$ will be modulated in relation to the degree of ionisation of the ignition spark gap. This modulated direct voltage $U_m$ will be fed directly into an evaluation circuit 3 so that there will be no need for a decoupling circuit.

In the evaluation circuits 3 according to FIGS. 1 and 4, signal processing is effected, for example, by means of a demodulator and one or several filters, in order to generate useful signals therefrom, i.e. the ion current signal $U_{Ion}$, which are then fed into control circuit 1 as well as into control unit 2. Control of measurement value detection will be effected by means of a line connection from control circuit 1 to evaluation circuit 3 and will be carried out by means of a measurement window in order to blank out any interference impulses caused by the ignition process itself.

From the usefull signals fed into control unit 2, information about the combustion process and engine behavior can be derived in order to derive control quantities for controlling the alternating current ignition system; these control quantities can then be fed into control circuit 1.

It will be possible, for example, to carry out a knocking signal evaluation which will cause ignition timing to be controlled and does not require any body noise sensor liable to suffer from interference noise. Furthermore, the information on the combustion process can be used to carry out an ignition energy control process; in particular, it is possible to determine the cylinder pressure co-fed into the lambda control system and injection control system.

Furthermore, a cylinder-1-detection may be derived from the useful signal. In addition, intermittent ignition can be detected in order to avoid damage to the catalytic converters. Finally, it is also possible to derive a load detection from the useful signal in order to carry out a cylinder-selective quietness control and cylinder-filling even distribution.

What is claimed is:

1. Circuit layout for ion current measurement within the combustion chamber of an internal combustion engine, comprising
   a) an ignition coil complete with primary and secondary windings,
   b) a spark plug connected to the secondary winding, and which also serves as an ion current probe,
   c) where, following ignition in the combustion space, a voltage signal is generated within the secondary winding, whose amplitude value is lower than the ignition voltage required for ignition and which effects a modulated voltage signal, as an ion current measurement signal, within the secondary winding related to the ionisation degree of the ignition spark gap;
   d) a controllable resonant circuit, comprising the primary winding and a capacitor, with this resonant circuit being driven by a control circuit such that the ignition energy required for ignition is provided as a bipolar ignition current,
   e) in addition, this control circuit drives the resonant circuit, following the spark firing phase, such that is the secondary winding the voltage signal necessary for measuring the ion current is generated as an alternating voltage signal;
   f) and, circuit means connected to one of the primary and secondary windings, for tapping off the ion current measurement signal.

2. Circuit layout according to claim 1 wherein the ignition coil comprises both a primary winding as well as an electrically isolated secondary winding, and wherein the means for tapping an ion current measurement signal is a test circuit arrangement connected to the secondary winding of the ignition coil.

3. Circuit layout according to claim 2 wherein the resonant circuit for generating the ion measurement signal is driven such that the difference between the frequencies of the voltage signal required for ion current measurement and the expected ion current signal is as large as possible.

4. Circuit layout according to claim 1 wherein the ignition coil is provided as an autotransformer and the measurement signal for the ion current is tapped at the primary winding end.

5. Circuit layout according to claim 4 wherein the resonant circuit for generating the ion current measurement signal is driven such that the difference between the frequencies of the voltage signal required for ion current measurement and the expected ion current signal is as large as possible.

6. Circuit layout for an ion current measurement within the combustion chamber of an internal combustion engine, comprising
   a) an ignition coil complete with primary and secondary windings,
   b) a spark plug which is located within a circuit of the secondary winding, and which also serves as an ion current probe,
   c) where, following ignition in the combustion space, a voltage signal is generated within the secondary circuit, whose amplitude value is lower than the ignition voltage required for ignition and which effects a modulated voltage signal, as an ion current measurement signal, within the secondary circuit related to the ionisation degree of the ignition spark gap,
   d) a controllable resonant circuit, comprising the primary winding and a capacitor, with this resonant circuit being driven by a control circuit such that the ignition energy required for ignition is provided as a bipolar ignition current,
   e) the ignition coil is an autotransformer,
   f) the primary winding of the ignition coil is connected to a switched mode power supply providing a direct voltage within the medium-high voltage range, and
   g) circuit means are provided for, following the spark firing phase, using the direct voltage generated by the switched mode power supply as an ion current measurement signal.

7. A circuit for ion current measurement within the combustion chamber of an internal combustion engine, comprising
   an ignition coil having a primary winding and secondary winding;
   a spark plug, located in a circuit of the secondary winding;
   a controllable resonant circuit, including the primary winding and a capacitor;
   a control circuit for driving the resonant circuit such that the ignition energy required for ignition is provided as a bipolar ignition current, and, additionally for
   driving the resonant circuit, following a spark firing phase, such that a voltage signal necessary for measuring the ion current is generated as an alternating voltage signal in the secondary winding with an amplitude value lower than the ignition voltage required for ignition and which produces a modulated voltage signal, as an ion current measurement signal, in the secondary circuit related to the ionisation degree of the ignition spark gap; and
   means for detecting and evaluating the ion current measurement signal connected to one of the primary and second windings.

8. Circuit arrangement for an ion current measurement within the combustion chamber of an internal combustion engine, comprising
   an ignition coil in the form of an autotransformer and having a primary winding and a secondary winding,
   a switched mode power supply providing a direct voltage within the medium-high voltage range, connected to one end of the primary winding the ignition coil;
   a spark plug located a circuit of the secondary winding;
   a controllable resonant circuit, including the primary winding and a capacitor;
   a control circuit for driving the resonant circuit such that the ignition energy required for ignition is provided as a bipolar ignition current, whereby following ignition in the combustion space, a voltage signal will be generated within the secondary circuit whose amplitude value is lower than the ignition voltage required for ignition and which produces a modulated voltage signal, as an ion current measurement signal, within the secondary circuit related to the ionisation degree of the ignition spark gap; and
   means for detecting and evaluating the direct voltage generated by the switched mode power supply following the spark firing phase as an ion current measurement signal.

* * * * *